(12) United States Patent
Trog et al.

(10) Patent No.: US 8,812,553 B2
(45) Date of Patent: Aug. 19, 2014

(54) METHOD AND DEVICE FOR IMPROVED ONTOLOGY ENGINEERING

(75) Inventors: Damien Trog, Oudergem (BE); Stijn Christiaens, Zele (BE); Pieter De Leenheer, Brussel (BE); Felix Urbain Yolande Van De Maele, B-Oostende (BE); Robert Alfons Meersman, Deurne (BE)

(73) Assignees: Collibra NV/SA, Brussels (BE); Vrije Universiteit Brussel, Brussels (BE)

( * ) Notice: Subject to any disclaimer, the term of this patent is extended or adjusted under 35 U.S.C. 154(b) by 45 days.

(21) Appl. No.: 13/266,897

(22) PCT Filed: Apr. 29, 2010

(86) PCT No.: PCT/EP2010/055850
§ 371 (c)(1),
(2), (4) Date: Jan. 13, 2012

(87) PCT Pub. No.: WO2010/125157
PCT Pub. Date: Nov. 4, 2010

(65) Prior Publication Data
US 2012/0102071 A1 Apr. 26, 2012

(30) Foreign Application Priority Data
Apr. 30, 2009 (EP) .................................. 09159179

(51) Int. Cl.
*G06F 17/30* (2006.01)
*G06F 7/00* (2006.01)
*G06N 5/02* (2006.01)

(52) U.S. Cl.
CPC . *G06N 5/02* (2013.01); *G06N 5/022* (2013.01)

USPC .......... 707/794; 707/776; 707/796; 707/809; 706/55

(58) Field of Classification Search
None
See application file for complete search history.

(56) References Cited

U.S. PATENT DOCUMENTS

| 2003/0172368 | A1* | 9/2003 | Alumbaugh et al. .......... 717/106 |
| 2004/0073542 | A1* | 4/2004 | Jones et al. ....................... 707/3 |
| 2006/0036633 | A1* | 2/2006 | Chong et al. .................. 707/101 |

(Continued)

FOREIGN PATENT DOCUMENTS

| EP | 1260916 A2 | 11/2002 |
| EP | 1327941 A2 | 7/2003 |
| WO | 2008088721 A2 | 7/2008 |
| WO | 2008134588 A1 | 11/2008 |

OTHER PUBLICATIONS

Moor et al. "DOGMA-MESS: A Meaning Evolution Support System for Interorganizational Ontology Engineering", ICCS 2006, LNAI 4068, pp. 189-202.

(Continued)

*Primary Examiner* — Dung K Chau
(74) *Attorney, Agent, or Firm* — Workman Nydegger

(57) ABSTRACT

A method for populating a data system is provided. The method includes the step of mapping at least one application path of the data system to at least one conceptual path of an ontology system. The application path addresses parts of the structure of the data system, and the conceptual path addresses parts of the structure of the ontology system. The method further includes the step of automatically populating the data system at a location addressed by the application path with data values contained in the conceptual path.

11 Claims, 9 Drawing Sheets

(56) References Cited

U.S. PATENT DOCUMENTS

| | | | |
|---|---|---|---|
| 2006/0101073 A1 | 5/2006 | Popa | |
| 2006/0129843 A1* | 6/2006 | Srinivasa et al. | 713/189 |
| 2006/0129905 A1* | 6/2006 | Spork | 715/500 |
| 2007/0162409 A1* | 7/2007 | Godden et al. | 706/48 |
| 2007/0299799 A1* | 12/2007 | Meehan et al. | 706/46 |
| 2008/0021912 A1 | 1/2008 | Seligman et al. | |
| 2008/0256121 A1* | 10/2008 | Liu et al. | 707/102 |
| 2008/0295068 A1* | 11/2008 | Kendall et al. | 717/104 |
| 2009/0094216 A1* | 4/2009 | Hou et al. | 707/4 |

OTHER PUBLICATIONS

Tang et al., "Towards Evaluating Ontology Based Data Matching Strategies", 4th International Conference on RCIS, May 19, 2010.
Wang et al., "An Ontology Data Matching Method for Web Information Integration", iiWAS 2008, Nov. 24-26, 2008, pp. 208-213.
Trog et al., "Towards Ontological Commitments with Omega-RIDL Markup Language", LNCS vol. 4824, pp. 92-106, Oct. 25, 2007.
Jarrar et al., "Ontology Engineering—The DOGMA Approach", Advances in Web Semantics, vol. LNCS 4891, , 2008.
Meersmann, STARLab Technical Report "Semantic Ontology Tools in IS Design", Esprit Project, "TREVI",nr. 2331, Oct. 22, 2002.
Zhong et al., "Path Similarity Based Directory Ontology Matching", IEEE 2008, Jul. 20, 2008, pp. 37-44.
Tang et al., "Towards Freely and Correctly Adjusted Dijkstra's Algorithm with Semantic Decision Tables for Ontology Based Data Matching", 2010 IEEE, vol. 1, Feb. 26, 2010, pp. 345-248.
Tang et al., "On Constructing, Grouping and Using Topical Ontology for Semantic Matching", VUB STARlab, OTM 2009/Workshops, Nov. 1, 2009, pp. 816-825, LNCS 5872.
International Search Report issued in PCT/EP2010/055850, Mar. 25, 2011, 4 pages.
European Office Action issued in EP10715860.2, dated Jan. 22, 2013.
Melnik et al, "Similarity Flooding. A Versatile Graph Matching Algorithm and its Application to Schema Matching," International Conference on Data Engineering, vol. CONF. 18, pp. 117-128, Feb. 26, 2002.
European Office Action dated Sep. 30, 2013 from related European Application No. EP10715860.2.

* cited by examiner

```
<delivery delivery_date="2008-09-01T06:31:27"
          total="14100">
    <product product_id="Box A" total="3600">
        <pallet_line pallet_id="SSCC1" quantity="1200" />
        <pallet_line pallet_id="SSCC2" quantity="1000" />
        <pallet_line pallet_id="SSCC3" quantity="1400" />
    </product>
    <product product_id="Box B" total="10500">
        <pallet_line pallet_id="SSCC1" quantity="1500" />
        <pallet_line pallet_id="SSCC2" quantity="1400" />
        <pallet_line pallet_id="SSCC3" quantity="1300" />
        <pallet_line pallet_id="SSCC4" quantity="2800" />
        <pallet_line pallet_id="SSCC5" quantity="3500" />
    </product>
</delivery>
```

SUPPLIER_DELIVERY.XML

```
<Delivery date="20080901063127"
          TotalQuantity="14100">
    <Pallet ID="SSCC1" TotalQuantity="2700">
        <Product ID="Box A" Quantity="1200" />
        <Product ID="Box B" Quantity="1500" />
    </Pallet>
    <Pallet ID="SSCC2" TotalQuantity="2400">
        <Product ID="Box A" Quantity="1000" />
        <Product ID="Box B" Quantity="1400" />
    </Pallet>
    <Pallet ID="SSCC3" TotalQuantity="2700">
        <Product ID="Box A" Quantity="1400" />
        <Product ID="Box B" Quantity="1300" />
    </Pallet>
    <Pallet ID="SSCC4" TotalQuantity="2800">
        <Product ID="Box B" Quantity="2800" />
    </Pallet>
    <Pallet ID="SSCC5" TotalQuantity="3500">
        <Product ID="Box B" Quantity="3500" />
    </Pallet>
</Delivery>
```

CONSUMER_DELIVERY.XML

Fig. 5

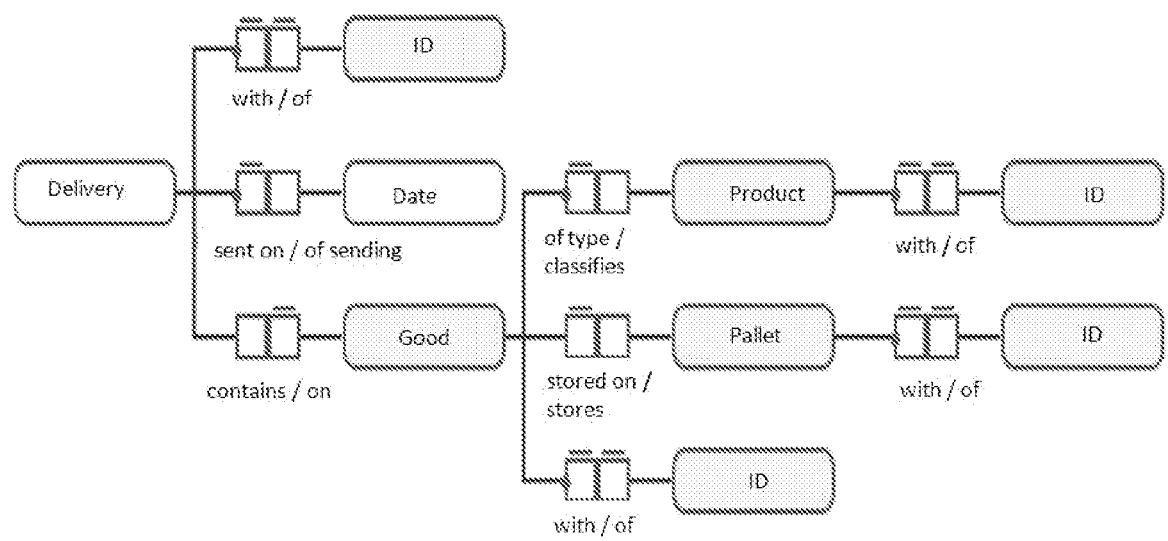
Fig. 6
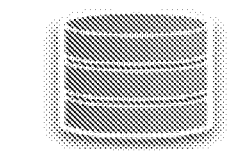
Generated Database
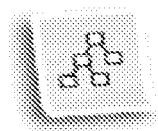
Generated Commitment
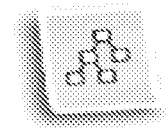
Supplier Commitment
Consumer Commitment
Supplier.Delivery.XML
Output.XML
Fig. 7

```
<Delivery date="20080901063127" TotalQuantity="14100">
<MessageHeader>
<Sender Name="Manufacturer" Address="XXX" .../>
<Receiver Name="Customer" Address="XXX" .../>
<MessageNo>10003</MessageNo>
</MessageHeader>
<MessageLine No="1">
<Pallet ID="SSCC1" TotalQuantity="2700">
<Product ID="Box A" Quantity="1200" />
<Product ID="Box B" Quantity="1500" />
</Pallet>
</MessageLine>
<MessageLine No="2">
<Pallet ID="SSCC2" TotalQuantity="2400">
<Product ID="Box A" Quantity="1000" />
<Product ID="Box B" Quantity="1400" />
</Pallet>
</MessageLine>
...
```

Fig. 11

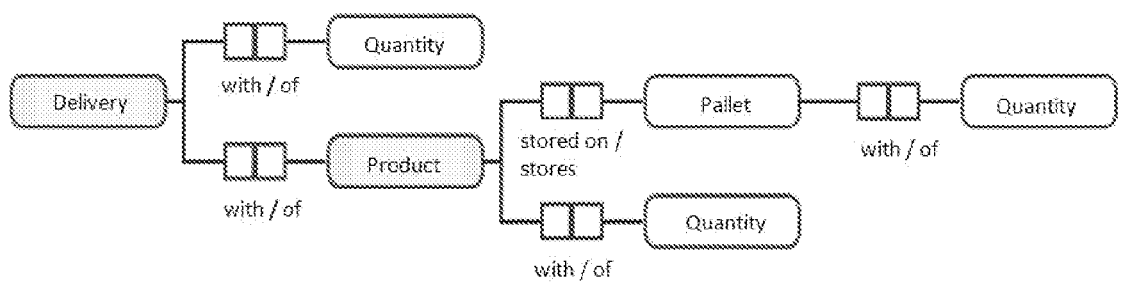

Fig. 12

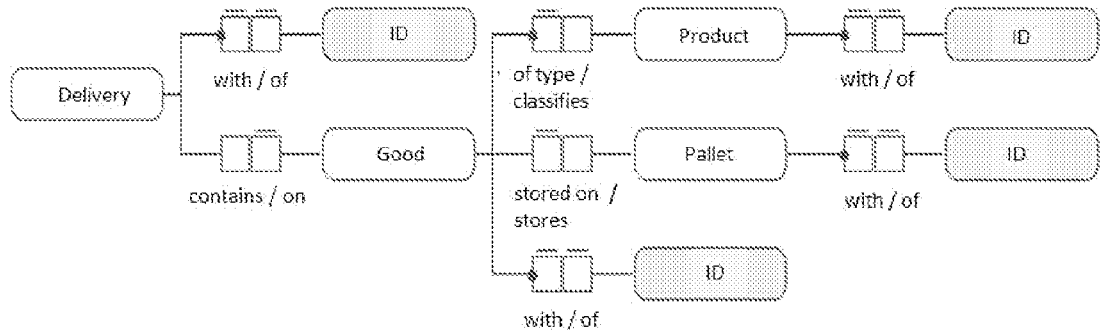

Fig. 13

```
<Delivery>                      <Document>
<DeliveryMessageDate>           <Header MessageType="STD"
<Date>                          ActualDespatchDate="2008-07-28" />
<Year>2008</Year>               </Header>
<Month>07</Month>               </Document>
<Day>28</Day>
</Date>
</DeliveryMessageDate>
</Delivery>
```

METHOD AND DEVICE FOR IMPROVED ONTOLOGY ENGINEERING

FIELD OF THE INVENTION

The present invention generally relates to the field of ontology engineering. More particularly, the present invention relates to solutions for communicating and translating between applications of any nature, content type or language via an ontology system.

BACKGROUND OF THE INVENTION

Internet and other open connectivity environments create a strong demand for sharing the semantics of data. Ontology systems are becoming increasingly essential for nearly all computer applications. Organizations are looking towards them as vital machine-processable semantic resources for many application areas. An ontology is an agreed understanding (i.e. semantics) of a certain domain, axiomatized and represented formally as logical theory in the form of a computer-based resource. By sharing an ontology, autonomous and distributed applications can meaningfully communicate to exchange data and thus make transactions interoperate independently of their internal technologies.

Ontologies capture domain knowledge of a particular part of the real-world, e.g., knowledge about product delivery. Ontologies can be seen as a formal representation of the knowledge by a set of concepts and the relationships between those concepts within a domain. Ontologies must capture this knowledge independently of application requirements (e.g. customer product delivery application vs. deliverer product delivery application). Application-independence is the main disparity between an ontology and a classical data schema (e.g., EER, ORM, UML) although each captures knowledge at a conceptual level. For example, many researchers have confused ontologies with data schemes, knowledge bases, or even logic programs. Unlike a conceptual data schema or a "classical" knowledge base that captures semantics for a given enterprise application, the main and fundamental advantage of an ontology is that it captures domain knowledge highly independent of any particular application or task. A consensus on ontological content is the main requirement in ontology engineering, and this is what mainly distinguishes it from conceptual data modelling.

The main foundational challenge in ontology engineering is the trade-off between ontology usability and reusability. The more an ontology is independent of application perspectives, the less usable it will be. In contrast, the closer an ontology is to application perspectives, the less reusable it will be.

Certain prior art systems use XML schemas as so-called ontologies. However, XML schemas are not ontologies for the following reasons. They define a single representation syntax for a particular problem domain but not the semantics of domain elements. They define the sequence and hierarchical ordering of fields in a valid document instance, but do not specify the semantics of this ordering. For example, there is no explicit semantics of nesting elements. They do not aim at carving out re-usable, context-independent categories of things—e.g. whether a data element "student" refers to the human being or the role of being as student. Quite the opposite, one can often observe that XML schema definitions tangle very different categories in their element definitions, which hampers the reuse of respective XML data in new contexts.

Ontology systems are typically used for querying multiple information systems. The ontology system typically comprises a union of the elements within said information systems. Prior art systems, as described in US2006/101073 and WO2008/088721, typically describe a system and method for data integration whereby multiple XML source schemas are queried through a common XML target schema.

However, recent developments in open connectivity applications demand communication between two or more information systems. Any communication between two or more information systems occurs in some format serialized in a language such as XML. In order to align the different formats (e.g., the format of the sending party and the format expected by the receiving party), people responsible for the systems have to align as well, until they reach an agreement on what to send, and how exactly it will be represented. Currently, this problem is solved ad hoc by creating some case specific solution (e.g., an XSLT script). However, there is absolutely no extra value or means for reusability created by taking this approach.

Current solutions mostly consist of creating custom transformations between every format. Point to point approaches are fast but difficult to make, manage and maintain. Hub and spoke approaches are more efficient but more difficult to develop and maintain, and have problems with flexibility.

Typical prior art systems, such as EP 1 260 916, model entities and the binary relations between them. This is like speaking a two-word language. However, real world natural language consists of sentences, linking multiple words in a semantical relationship. It is inherent that sentences comprise more meaning.

In the paper "Towards Ontological Commitments with Ω-RIDL Markup Language" (D. Trog et al., Advances in Rule Interchange and Applications, Lecture Notes in Computer Science, pp. 92-106) a markup language (XML) representation of the Ω-RIDL language is described. The different constraints are presented in both controlled natural language and markup language. A representation of a conceptual path is shown. It is to be noted that a conceptual path provides the basis to compose a conceptual query. However, the paper remains silent on how such a query can be composed or executed. The paper does not discuss performing data format translations. Only conceptual querying is discussed, which involves reading. Updates, which involve both reading and writing operations to perform a translation, are not discussed.

In "Ontology Engineering—the DOGMA approach" (M. Jarrar et al, Advances in Web Semantics I, vol. 4891, 2009-01-01, pp. 7-34) the authors describe the DOGMA ontology approach compared with other approaches. The paper is about the motivation behind splitting the Ontology Base (also Lexon Base) and axiomatizations (also commitments), what they dub the Double Articulation Principle. The constructs are formalized in first order logic, with discussion about description logics. Only a search/retrieval scenario is given as an example without actually explaining how it would work. Again this is limited to conceptual querying.

Patent application EP1327941 A2 describes a method for transforming data from one data schema to another by mapping the schemas into an ontology model, and deriving a transformation. The result of the method is a unidirectional transformation script, such as XSLT, which is processed by a pre-existing transformation engine. The patent application describes a frame-based approach (i.e. classes having properties), where data schema elements are mapped on properties of classes.

Hence, there is a need for more natural language and reusability in ontology engineering and more specifically in the communication between information data systems.

AIMS OF THE INVENTION

The present invention aims to provide a method and device for populating a data system used in a computer application and mapped to an ontology system. The invention further aims to provide an efficient and flexible platform for communicating between data systems committed or mapped to the ontology system.

SUMMARY

The solution of the present invention adheres a fact-based approach (wherein objects play roles with each other) that allows construction of complex paths. These paths are a form of controlled natural language that improve readability and reduce the number of concepts needed.

In a first aspect the invention provides a method for populating a data system for use in a computer application, whereby the data system has a structure addressable by at least one application path. The method comprises the steps of:
a. mapping the at least one application path of the data system to at least one conceptual path of an ontology system, said at least one conceptual path addressing a part of the structure of the ontology system, and
b. populating the data system at a location addressed by the application path with data values contained in the conceptual path.

In the proposed method some given ontology system is used. The ontology system has a certain syntactic structure. Conceptual paths can be defined that are capable of addressing parts of the structure of the ontology system. A data system used by a computer application is provided with a given structure that can be addressed (or parts thereof can be addressed) by application paths. When linking the data system to the ontology system, the present invention proposes performing a mapping between the application paths of the data system and the conceptual paths of the ontology system. In this invention these mappings are interpreted in real-time by a translation engine as described in detail below. In this way, different data structures with different representations, syntax and terminology are mapped to a shared and agreed upon ontology, resulting in increased transparency, compliance and reuse, as well as automated translation between disparate systems.

After the mapping step the data system is populated with data values comprised in the conceptual path and this at a location in the data system addressed by the application path.

In a preferred embodiment the method comprises the initial step of generating the data system. This is possible by exploiting the structure of the given ontology system.

In one embodiment the method further comprises the step of linking an additional data system acting as a source data system to the ontology system. This is achieved by mapping at least one application path of the additional data system to the at least one conceptual path of the ontology system. The other data system then acts as target data system.

The ontology system is then shared, so that transformations between said data systems can be derived, i.e., between the source and the target data system. Also transformations between more than one source data system and more than one target data system can be envisaged. The transformations provide to read data into the ontology system from one data system. The at least one conceptual path of the ontology system is then populated with data values contained in the at least one application path of the additional data system. The transformation further also provides to write said data to a data system. Said data are written from conceptual paths of the ontology system to the (target) data system. The present invention allows for querying as well as for updating data systems.

In a typical embodiment the additional data system has a structure different from the other data system. However, in a specific embodiment it is possible that their structure is the same. In one embodiment the schemas of the data system and the additional data system acting as source data system are the same. Using this approach a data system can be trimmed, enriched or its contents validated. Data system trimming results in a data system that contains only a subset of the data contained within. This can occur e.g., in a scenario where the data system contains information about customers, orders and invoices. By trimming the data system, a new data system can be produced that only contains the customer information. In enrichment additional data is added. E.g., when one wants to enrich the customer data with information from accounting, one can connect to the accounting data and add the additional data. Validation allows checking whether the data in the data system follows the rules as they were specified in the commitment. Since the rules are richer this offers better checks than validation of the data schema.

The present invention provides conceptual reading and writing in any format and is as such not limited to relational database formats or XML messages. This allows true format translations between data systems of different formats. As already mentioned, the format translations may be provided between more than one source data system and/or more than one target data system. In a specific embodiment said source and target data systems are the same data system.

In one aspect the present invention provides a data storage system for storing data instances in the ontology system. In one embodiment said storage data system is a relational database. Alternatively, said storage data system is memory.

At least one conceptual path may contain one or more identifiers of one or more of the source and/or target and/or storage data systems, and the commitment layer comprises commitments for mapping said identifiers. A first identifier of a sending party may be provided and a second identifier of a receiving party.

At least one conceptual path may contain metadata related to messaging or translation between the source and/or target and/or storage data systems, and the commitment layer comprises commitments for mapping the metadata. In a particular embodiment an identifier is provided of the parties that sent or received the metadata. The metadata may be a line number or a message sequence and may be used for security, logging, message ordering and message duplication.

In an embodiment at least one conceptual path contains virtual concepts having no corresponding data value in the data system (or optionally in the source data system). Virtual concepts add to the real-world conception and may be needed for a better conceptual understanding.

In a further embodiment mappings onto queries may be provided. Said queries may comprise calculations. The queries are preloaded with the values found in the data system. If those values cannot be found the queries are executed and calculated.

In yet a further embodiment for one or more of the mappings the instances need to be manipulated after reading by executing a function.

In another embodiment mappings onto functions may be provided. Said functions comprise procedural logic that performs operations on the data in the input and results in data as output for further processing in the translation. These functions can be custom, written in specific scripting language (e.g., Groovy). Mappings onto rules may be provided. Said rules check if the data in the input are consistent and correct. Custom rules can be written via said functions.

In another embodiment said ontology system provides a transformation from at least a part of the logical representation of data in said source data system to at least a part of the logical representation of data in said target system.

In yet a further aspect a program is provided executable on a programmable device containing instructions, which, when executed, perform the method as set out above.

In a further aspect the invention relates to a device for populating a data system for use in a computer application, whereby the data system has a structure addressable by at least one application path. The device comprises means for receiving mapping information for mapping the at least one application path of the data system to at least one conceptual path of an ontology system, said at least one conceptual path addressing a part of the structure of the ontology system, and means for populating the data system based on the received mapping information.

BRIEF DESCRIPTION OF THE DRAWINGS

FIG. 5 shows two XML messages generated by two different parties, supplier and consumer, containing the same information about the delivery of products.

FIG. 6 represents a pattern for a delivery based on a real-world description of the delivery of products.

FIG. 7 shows how a supplier's XML message may be translated to the format of a consumer.

FIG. 11 illustrates an XML message comprising messaging information.

FIG. 12 shows a naive pattern created from XML files comprising quantity concepts.

FIG. 13 shows a pattern according to the invention comprising derived concepts.

DETAILED DESCRIPTION OF THE INVENTION

Figure 1:
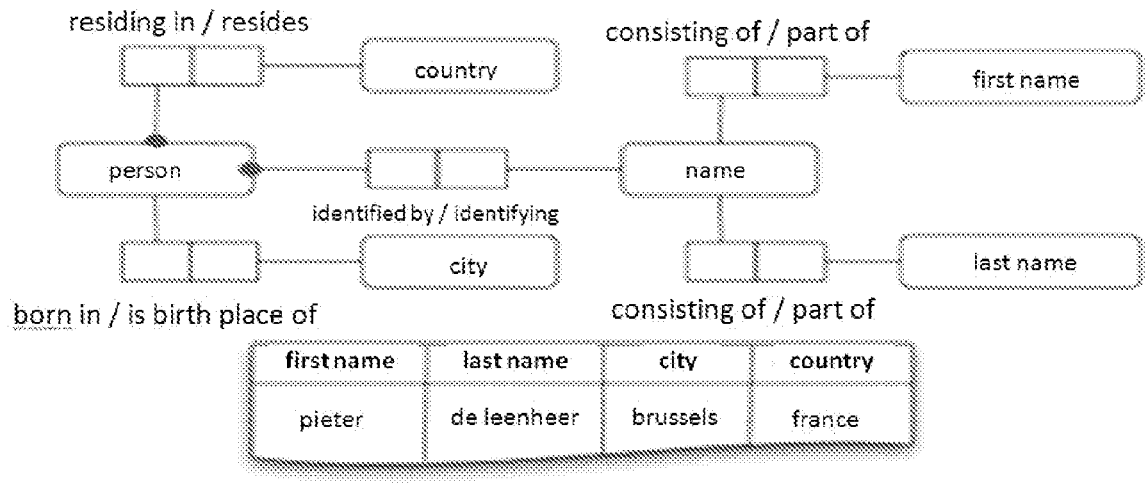
FIG. 1 illustrates on top a semantic pattern that could be useful to annotate the logical data schema on the bottom of the figure.

Ontologies in general define shared representations for two essential and dual aspects of semantics of a domain, i.e. a formal semantics for information allowing information processing by a computer, and a real-world semantics allowing linking machine processable content with meaning for humans based on consensual terminologies and natural language.

The ontology representation introduced in the present invention adopts a fact-oriented modelling approach. In this approach facts are considered the units of communication and hence representations are built for semantics from abstracting these observed facts into fact types. Facts represent objects (entities or values) playing a certain role (part in relationship). This is different from attribute-based approaches such as object-oriented modelling where the domain is represented by abstracting data types from observed objects.

A data system is defined by the combination of an intensional and extensional part. Its intensional definition prescribes the constraints data elements in the form of data types (e.g., integers, strings) and relationships between them (e.g., multiplicity). An extensional definition prescribes which data elements belong to which data types. A data system can be annotated by an ontology and can be regarded as an application committing to the ontology. An application commits to an ontology system if the data system it is using, maps on the ontology system. Such a mapping is performed by mapping application paths that address a part of the structure of the data system. An example of a data system is a relational database. In a relational database an example of an application path is a particular attribute in a particular table. The intensional part is defined by its schema. The extensional part is defined by its population. Other examples of data systems include XML and its corresponding schema, EDI messages, etc. The ontology system can also handle data systems for which the intentional part is not available e.g., XML having no corresponding schema. For example, in an XML file an application path could be an XPath.

In the proposed approach the ontology system separates the representation of domain semantics and the annotation of the application with these semantics in three separate layers: Lexon Base, Pattern Base, Commitment Layer.

A lexon is a quintuple that defines a plausible binary fact type within a certain context. The quintuple is defined as {Context, Head-term, Role, Co-role, Tail-term}. The role, and its reverse co-role, defines the conceptual relation between the head and tail term. Intuitively a lexon may be read as: within the context, the head term may have a relation with the tail term in which it plays a role, and conversely, in which the tail term plays a corresponding co-role.

A context in a lexon provides a reference to one or more lexical resources and/or parts of a lexical resource (such as documents) from which the lexon was elicited. Contexts are important to prevent lexical ambiguity of terms within lexons, as the meaning of terms may vary according to the context.

Lexons as such do not have a reading direction, however when constructing a path it can be given one out of two directions by either starting with the head term or tail term.

A lexon base is defined as a set of lexons. The goal of the lexon base is to provide a shared and evolving resource that is used to reach a common and agreed understanding about the ontology vocabulary and is thus aimed at human understanding, associating natural language terms. The lexon base reflects the syntactic structure of the ontology system.

A conceptual path in a lexon base is defined by a context-term pair or a finite concatenation of lexons in that lexon base. In the latter case it also imposes a particular reading direction. A conceptual path may be a single concept (e.g., Delivery), a lexon (e.g., Date of Delivery) or a grouping of different lexons (e.g., Day of Date of Date and Time of sending Delivery). Hence, conceptual paths are capable of addressing parts of the structure of the ontology system. Conceptual paths are used in patterns to define semantic constraints and in commitments to define mappings.

A semantic pattern is defined by a meaningful selection of conceptual paths in a particular lexon base plus a set of semantic constraints. Each semantic constraint has a certain type and is expressed as a collection of sets of conceptual paths. FIG. 1 illustrates a semantic pattern in the ORM notation. It includes many different conceptual paths. E.g., from bottom right term Last Name to the upper left term Country, we verbalise the conceptual path: Last name part of Name identifying Person residing in Country. A pattern base is defined by a set of semantic patterns.

A commitment from a computer application to an ontology system is defined by a selection of semantic patterns part of the lexon base in the ontology system, a set of semantic constraints on these patterns and a set of mappings that map from the data system used by the application to the ontology system. More precisely, the application paths of the data system are mapped to conceptual paths in these patterns. The commitment layer is defined by the set of all commitments.

Each individual commitment within the commitment layer is a representation of the semantics of a specific data system in terms of the lexon base. Patterns can be reused across commitments if they are selected from the same pattern base. Doing so, the ontology system establishes semantic interoperability between data systems and applications in general (e.g. software agents and web services).

Rules constrain and attribute specific interpretations to a selected subset of patterns contained within the pattern base, e.g., each Person has at least one address. As such each individual commitment rule represents the semantics of a specific application.

Application paths addressing part of the structure of the data system may be mapped onto conceptual paths. Mappings are required to automatically create data value transformations between a structured data system and a structured ontology system. Given a source data system and a target data system, and their respective mappings to a shared part of an ontology system, it is possible to automatically create data value transformations between said source and target data systems. The transformation is automatically done by a translation engine.

Figure 2:
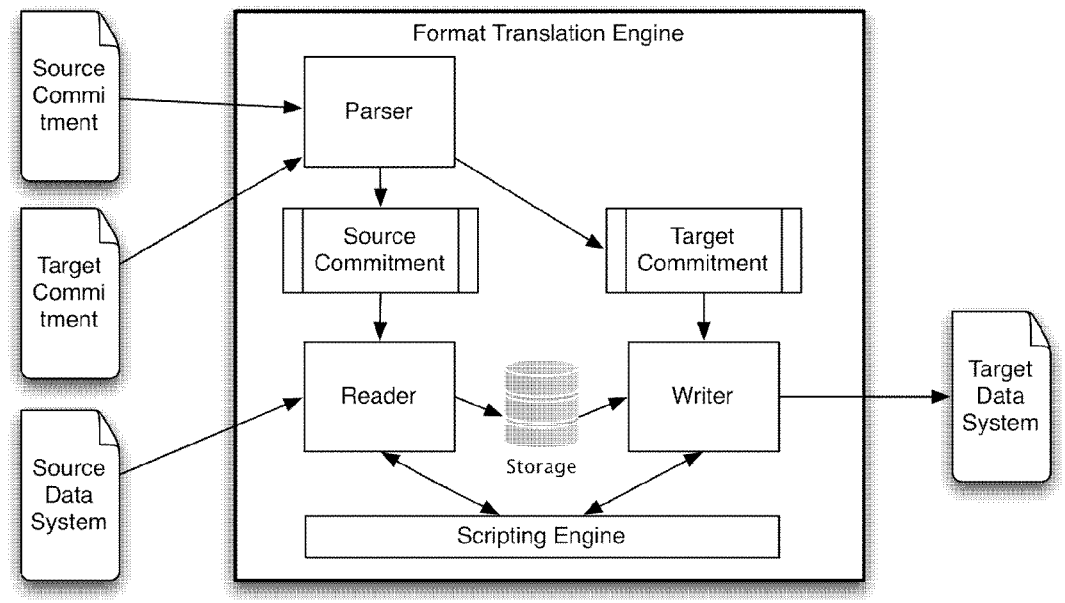
FIG. 2 represents an overview of inputs and outputs of the translation engine.

The translation engine works by parsing a source and target commitment, which contain the mappings of application paths from a data system onto conceptual paths from an ontology system, and read data symbols from the source data system and write the translated symbols into the target data system. FIG. 2 gives an overview of inputs and outputs of the translation engine. The engine itself is componentized into:
- a parser that builds a syntax tree from a textual commitment;
- a reader that takes care of querying a data system;
- a writer that takes care of updating and creating data in a data system;
- a scripting engine accessible by the reader and writer.

Custom scripts can be written by users of the engine that allow modification of the runtime behaviour without changing the engine itself. The translation engine uses a push and pull approach depending on the kind of data system.

Push Approach

In the push approach the Reader starts reading the source data system and pushes the data symbols into the storage system, which are immediately taken up by the Writer and written into the target data system. In effect the Source Data System is pushing its data into the Target Data System.

The push approach is used for tree-structured source data systems, such as XML. In the source commitment the mappings are processed in the order that they are listed. The first mapping is assumed to point to the root element.

The mappings should be in the following form:

```
map "/a" on A.
map "/a/b" on B of A.
map "/a/b/c" on C of B of A.
map "/a/d" on D of A.
```

The 'map' keyword indicates that this statement is a mapping. The left part of the mapping is an application path expressed in a path language that can be used to address elements in the data system (e.g., XPath). The application path is enclosed in double quotes.

The application path contains enough information to construct a query processable by a query engine that supports the data format of the data system. The Reader sends these queries to the appropriate query engine. For example in XML, XPaths can be processed as queries by an xpath engine like Xalan. The same application path is also used by the Writer to write data to the location the path addresses.

The 'on' keyword separates the left and right parts of the mapping statement. On the right a conceptual path is written, constructed using symbols from the ontology system. Each statement should end with a dot.

Mappings are processed in the given order. The conceptual paths are related to each other by this order. In the above example the instance for the A concept is the same in each of the mappings. We know this because the first element in the application path is also the same and because it is pointing to the root element. Other non-root elements can be repeated and the corresponding concept will be instantiated every time. For example when there are three b elements, three corresponding B concepts are instantiated. For each of the mappings zero or more conceptual paths can be instantiated, depending on the number of elements in the source data system.

Following is an example XML that is valid for the above mappings.

```
<a>
    <b>
        <c>text</c>
    </b>
    <b>
        <c>text2</c>
    </b>
    <b>
        <c>text3</c>
    </b>
</a>
```

This instantiates the following paths (the instances of concepts are between parentheses, where entities are identified by a number prefixed with the @ symbol, and values are shown between double quotes):

```
A(@1).
B(@1) of A(@1).
B(@2) of A(@1).
B(@3) of A(@1).
C("text") of B(@1) of A(@1).
C("text2") of B(@2) of A(@1).
C("text3") of B(@3) of A(@1).
```

The writer uses the reverse of this process and constructs the data for the target data system from these instantiated paths. The writer looks up which mapping corresponds to the instantiated path and constructs the elements in the data system.

Pull Approach

Alternatively, a pull approach lets the Writer decide which data it needs from the Reader. In this case, the Writer asks the Reader for each piece of data it needs. The writer is pulling the data from the reader, which puts it in the storage, ready for the Writer to access. The pull approach is used for graph based data systems, such as relational databases. As opposed to the push approach, the pull approach starts with the writer requesting instantiated paths from the reader for its mappings.

Given an ontological commitment conceptual queries are executed on any data system that is correctly annotated by that commitment. A conceptual query is a language construction expressed in terms of one or more conceptual paths in a commitment. Given the mappings between conceptual paths and application paths in a commitment, the conceptual queries can be executed as logical queries in the committing data system. This is done by translating (the conceptual paths in) the conceptual query into a logical query in terms of the application paths of the data system. A logical query is a query within the data system. For example, a logical query on a relational database would be expressed in SQL.

In one embodiment ontological commitments are specified in the Ω-RIDL (Omega-RIDL) controlled natural language. The language describes semantic rules in terms of conceptual paths in which role- and co-role-labels need to be interpreted as an ontological relationship. Ω-RIDL is both a conceptual query and commitment specification language.

The systems and methods of the invention may be seen as a further improvement of the DOGMA approach for developing ontology-guided mediation of agents. DOGMA (R. Meersman., Proc. of the International Symposium on Methodologies for Intelligent Systems (ISMIS), p 30-45, 1999) is an ontology approach and framework that is not restricted to a particular representation language. Embodiments of the present invention apply the DOGMA framework for ontology based data mapping.

Figure 3:
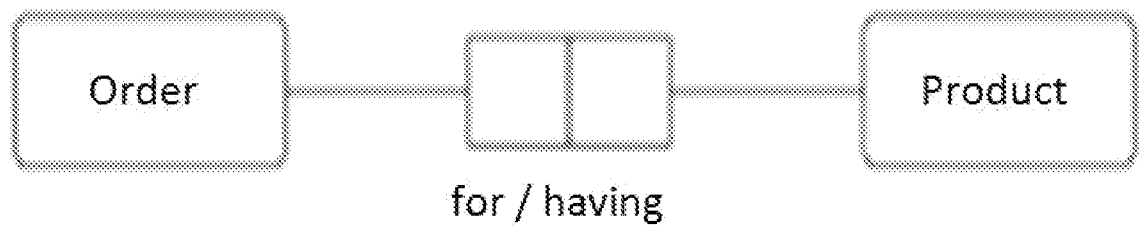
FIG. 3 illustrates a fact-type that can be traversed in two directions, denoting two paths.

FIG. 3 illustrates a relationship between two concepts Product and Order. Each lexon can be traversed in two directions, denoting two paths: an Order for a Product, and a Product having an Order.

Conceptual paths can be concatenated to form composite paths. These concatenations can be further formalised with rules and constraints, restricting the possible use of the concepts and relationship in the ontology.

The annotation may be expressed in Ω-RIDL. FIG. 1 illustrates on top a semantic pattern that could be used to annotate the logical data schema on the bottom of the figure.

Each relevant symbol in the logical data schema instance is annotated by a meaningful conceptual path in the pattern. If a relevant symbol cannot be annotated by the current pattern version, the pattern is changed in such a way that the new pattern version allows annotating the pending symbols.

In the example above, all attributes in table People (the application paths) can be mapped on conceptual paths in the pattern. Hence, one can read out:

map "People.firstname" on "First Name part of Name identifying Person"
map "People.lastname" on "Last Name part of Name identifying Person"
map "People.city" on "City is birth place of Person"
map "People.country" on "Country resides Person"

The example above is trivial, as the terms for the attribute symbols are intuitively interpretable. However in real-world scenarios the meaning of the symbols in the logical schema is usually implicit. Even in this example: although the independent meanings of the symbols city, country and person are intuitively obvious, their inter-relation is not. Country and City appear to be not related at all, as can also be inferred from the attribute values. On the other hand, first name and last name appear to be related to each other indirectly via the meronymical (part-of) relationship with name.

The above annotation system works for different types of data management technology, including relational tables and columns, object-oriented classes, or XML tags. Given a shared ontology, queries in one annotated logical data schema can be automatically translated to queries in any other logical data schema that is annotated with this ontology. Hence, this provides a universal approach to data integration. Furthermore, as the annotations are close to natural language, the meaning of symbols in the schemas can be described and interpreted by the layman end user.

Structural Independence

The information systems of different involved parties can represent data of a real-world situation in countless technical or logical representations. When said parties want to communicate about this information, this leads to various forms of information mismatches. The mismatch is caused by a structural difference. Therefore structural independence within the ontology system is required.

Figure 4:
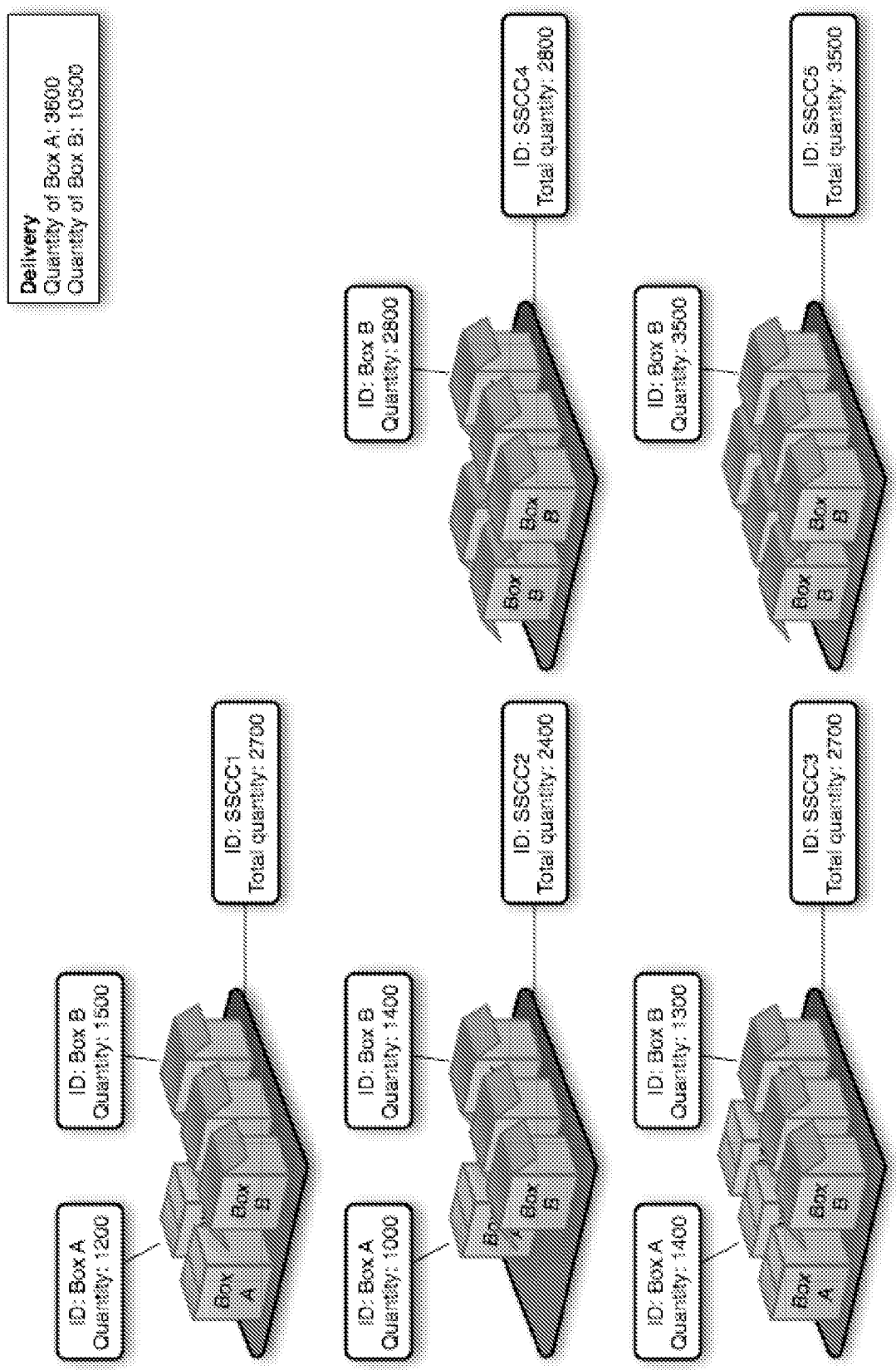
FIG. 4 shows a real-world example related to a fictive delivery of products.

Consider the following real-world example related to a fictive delivery of products, as illustrated in FIG. 4. The boxes (of product type A or B) are stacked on a number of pallets. When the involved parties see this real-world situation they can easily form an agreement on the meaning of this situation. For example: the pallet with ID "SSCC1" contains 1200 boxes of type "Box A"; there are 1300 boxes of type "Box B" on pallet with ID "SSCC3"; the pallet with ID "SSCC1" contains a total quantity of 2700 boxes.

XML is the quasi standard for messaging between information systems. XML (Extensible Markup Language) is a general-purpose markup language. It is classified as an extensible language because it allows its users to define their own elements. Its primary purpose is to facilitate the sharing of structured data across different information systems, particularly via the Internet. Because of its tree based nature, an order is imposed. The systems and methods of the present invention are not limited to XML for messaging between information systems, but include any representation format, e.g., EDI, JSON, CSV.

FIG. 5 shows two XML messages generated by two different parties that actually contain the same information about the delivery of products. The XML documents, however, are in effect two different perspectives or different technical representations of the same information. The supplier chose the structure delivery→product→pallet_line.

He introduced the concept "pallet_line", which does not exist in the real-world. This translates to looking at the delivery from a product perspective. A delivery contains products and these products are stored on pallets. The consumer chose the structure delivery→pallet→product.

This is a pallet perspective. A delivery contains pallets and these pallets contain products.

In order to model a real-world situation independent of technical representation, the present invention provides conceptual modelling of different structural representations of the same information.

XML and many other data structuring formats adhere a tree-based structure which imposes a certain order and limits its applicability. In contrast, semantic patterns in an ontology system as in the present invention are structured as a more versatile graph, in order to be free from an imposed order. The pattern of FIG. 6 represents a delivery based on the real-world description. Patterns may introduce (virtual) concepts missing in both structural representations, like the Good concept that was missing in both delivery and consumer representations. A Product is an abstract concept that is the type of the Good. The product cannot be placed on a Pallet, but the tangible Good can. By introducing this Good no choice needs to be made whether a delivery contains products or pallets. A Delivery contains Goods which are stored on Pallets and are of a type of Product.

In a next step the technical XML representations need to be mapped to the above conceptualization of the real-world.

The commitment of the consumer's XML message could be the following:

```
map "/Delivery"
  on Delivery.
map "/Delivery/Pallet"
  on Pallet stores Good on Delivery.
map "/Delivery/Pallet/Product"
  on Product classifies Good on Delivery.
map "/Delivery/@date"
  on Date and Time of sending Delivery.
map "/Delivery/Pallet/@ID"
  on ID identifies Pallet stores Good on Delivery.
map "/Delivery/@TotalQuantity"
  on count(Good on Delivery).
map "/Delivery/Pallet/@TotalQuantity"
  on count(Good (stored on Pallet and on Delivery)).
map "/Delivery/Pallet/Product/@Quantity"
  on count(Good (of type Product and stored on Pallet and on Delivery)).
map "/Delivery/Pallet/Product/@ID"
  on ID identifies Product classifies Good on Delivery.
```

The commitment of the supplier's XML message could be the following:

```
map "/delivery"
  on Delivery.
map "/delivery/product"
  on Product classifies Good on Delivery.
map "/delivery/product/pallet_line"
  on Pallet stores Good on Delivery.
map "/delivery/@delivery_date"
  on Date and Time of sending Delivery.
map "/delivery/@total"
  on count(Good on Delivery).
map "/delivery/product/@product_id"
  on ID identifies Product classifies Good on Delivery.
map "/delivery/product/@total"
  on count(Good (of type Product and on Delivery)).
map "/delivery/product/pallet_line/@quantity"
  on count(Good (of type Product and stored on Pallet and on Delivery)).
map "/delivery/product/pallet_line/@pallet_id"
  on ID identifies Pallet stores Good on Delivery.
```

In the commitments application paths are mapped onto conceptual paths. In this example the application paths are XPaths for XML. The conceptual paths are expressed in the Q-RIDL language. XPath (XML Path Language) is an expression language for addressing portions of an XML document, or for computing values (strings, numbers or boolean values) based on the content of an XML document.

As an example and illustrated in FIG. 7, consider that the supplier's XML message needs to be translated to the format of the consumer.

Figure 8:
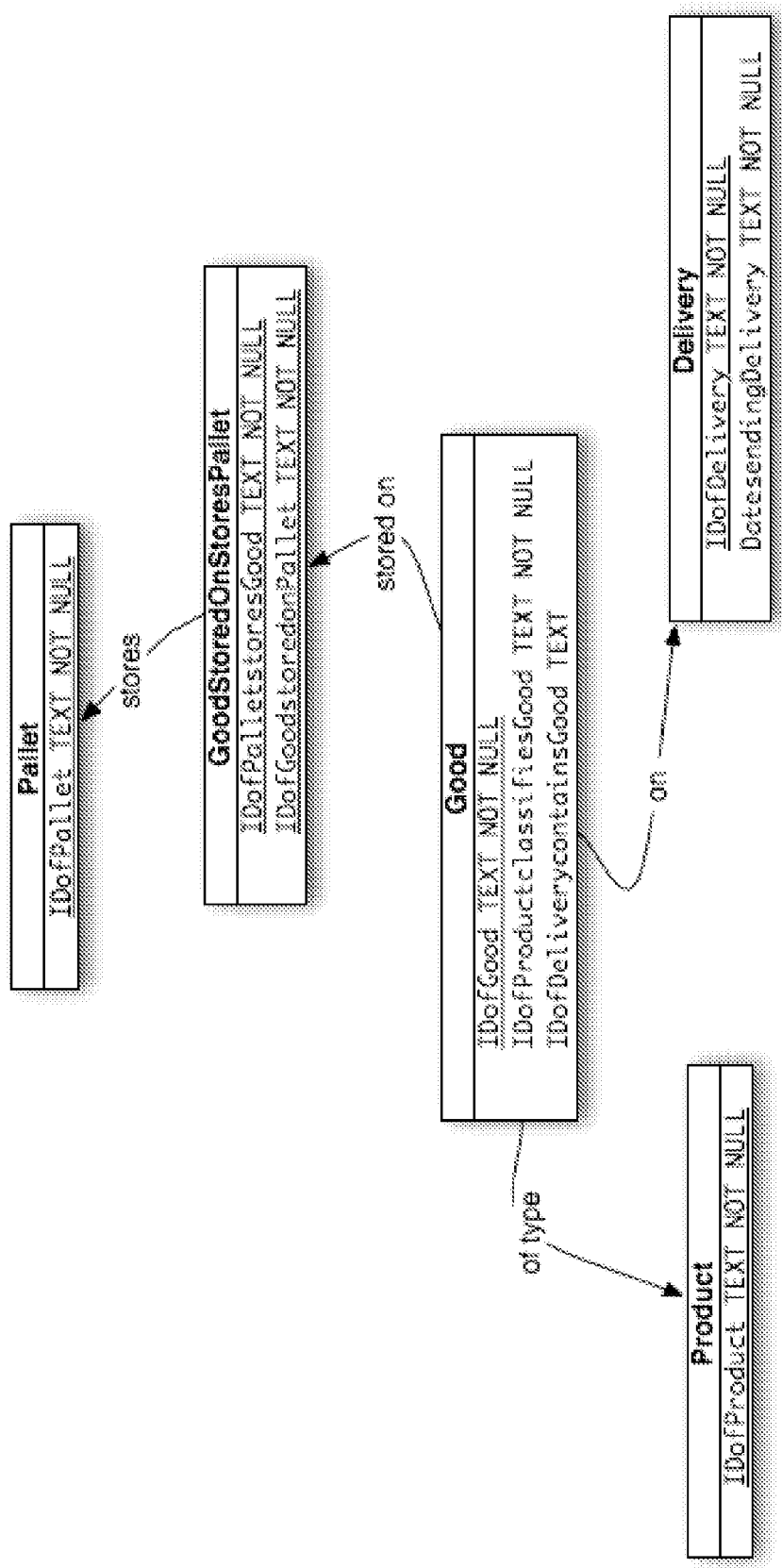
FIG. 8 shows a relational database generated from the pattern of FIG. 6 for storing information contained in the XML messages of FIG. 5.

The following steps are taken:

From the pattern a relational database is generated, as shown in FIG. 8, able to store all the information contained in the XML messages. At the same time a commitment for this database to the pattern is generated.

The information is read from the supplier's XML message by executing the XPaths found in the mappings of the Supplier Commitment. The instances are written to the generated database.

A new output XML is created and populated by the instances stored in the generated database.

The commitment to the generated database may look as follows:

```
map "Delivery.IDofDelivery"
  on ID of Delivery.
map "Delivery.DatesendingDelivery"
  on Date sending Delivery.
map "Product.IDofProduct"
  on ID of Product.
map "Good.IDofGood"
  on ID of Good.
map "Pallet.IDofPallet"
  on ID of Pallet.
map "(GoodstoredonstoresPallet.IDofGoodstoredonPallet = Good.IDofGood)"
  on Good stored on Pallet.
map "(GoodstoredonstoresPallet.IDofPalletstoresGood = Pallet.IDofPallet)"
  on Pallet stores Good.
map "(Good.IDofProductclassifiesGood = Product.IDofProduct)"
  on Good of type Product.
map "(Good.IDofDeliverycontainsGood = Delivery.IDofDelivery)"
  on Good on Delivery.
```

By using a relational database in between, where no order is imposed, the problem of differing structures in the XML files is automatically solved. Optionally the instances may be stored in any other storage means instead of in a database, e.g., in memory, or another XML file.

Because of the undirectedness of the graph approach in the middle of the solution, there is also no direction needed in the commitment. Whereas in a traditional approach, two translation scripts (XSLT from source to target and another from target to source) have to be written to obtain a two-way translation, here either translation direction can be generated.

In the example the information of both parties is represented in XML. In one embodiment a method for translating different technical representations of the same information is provided. In another embodiment a method is provided for translating different formats that inherently comprise different technical representations of the same information.

In one embodiment a solution is provided for communicating between a first and a second information system having different technical representations for the same information, wherein said information systems are linked to an ontology system by means of commitments. The following steps are performed:

generating a relational database from said pattern,
generating a commitment to said pattern from said database,
reading the input message by executing the mappings (reading) in the first commitment. The instances are written to the generated database,
writing the output message by executing the mappings (writing) in the second commitment using the data that was read.

It must be noted that communicating parties may be multiple, i.e. possibly more than two. As such the methods of the present invention are not limited to two information systems, but apply to two or more information systems. In one embodiment the information systems may be one and the same.

In what follows specific embodiments providing structural independence are explained by means of examples.

Example 1

Assigned Identifiers

An identifier is a language-independent label, sign or token that uniquely identifies an object within an identification scheme.

Identification is always relative, except when global identifiers are used. A product can be identified by the combination of its assigned identifier and the identifier of the party that assigned it. The relationship between the identifier and the party should be reflected in the pattern and the commitments.

Consider the example where a Product has an Identifier and an Identifier is assigned by a Party. The constraint that there can only be one ID for a product assigned by a specific party cannot be graphically represented, but may be specified by the following textual constraint: Product is identified by (ID of Product) and (Party assigns ID of Product).

Figure 9:
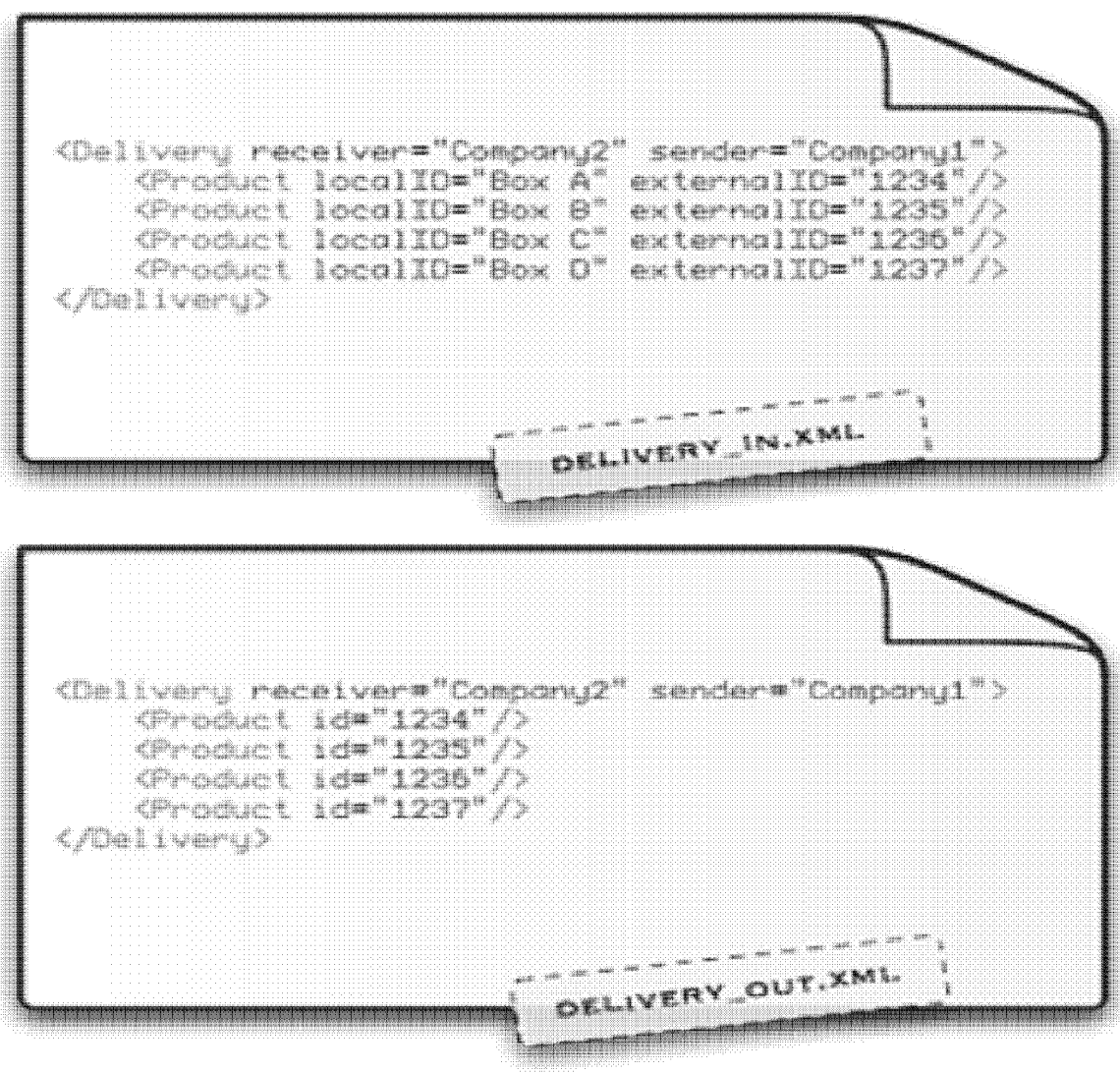
FIG. 9 shows two XML examples with a different technical representation for identifiers.

FIG. 9 shows two XML examples with a different technical representation for identifiers. In Delivery_in.xml the local and external id are stored. Local means the ID that was assigned by the receiver (i.e. Company2) and external means the ID that was assigned by the sender (i.e. Company1). In Delivery_out.xml only the id as assigned by the sender is stored.

Figure 10:
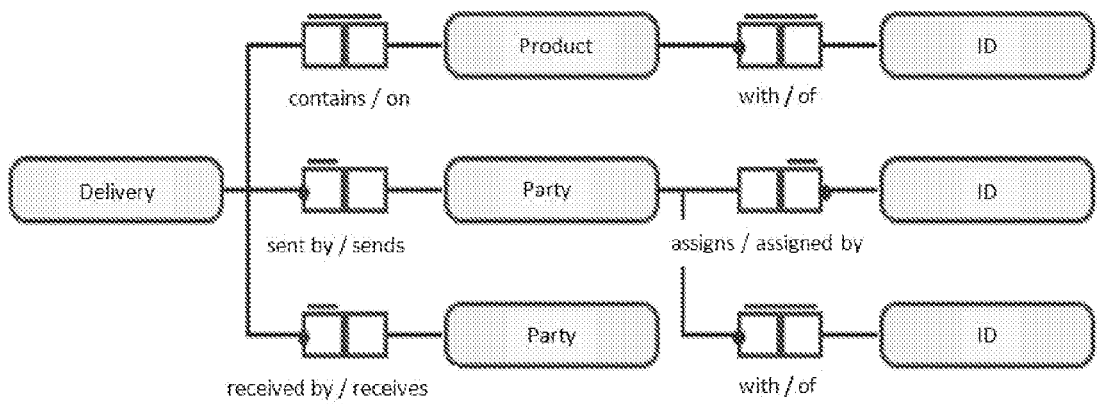
FIG. 10 illustrates a pattern for the example of FIG. 9.

FIG. 10 illustrates a conceptual model for this example. When mapping the identifiers in the commitments, it is specified where the identifier came from. In the example, the commitments for the respective XML files contain the following:

---

Delivery_in commitment:
   map /"Delivery"
     on Delivery.
   map "/Delivery/Product"
     on Product on Delivery.
   map "/Delivery/@receiver"
     on ID of Party receives Delivery.
   map "/Delivery/@sender"
     on ID of Party sends Delivery.
   map "/Delivery/Product/@externalID"
     on (ID of Product on Delivery) and (ID assigned by Party receives Delivery).
   map "/Delivery/Product/@localID"
     on (ID of Product on Delivery) and (ID assigned by Party sends Delivery).
Delivery_out commitment:
   map "/Delivery"
     on Delivery.
   map "/Delivery/Product"
     on Product on Delivery.
   map "/Delivery/@receiver"
     on ID of Party receives Delivery.
   map /"Delivery/@sender"
     on ID of Party sends Delivery.
   map "/Delivery/Product/@id"
     on (ID of Product on Delivery) and (ID assigned by Party receives Delivery).

---

The mappings for the product ids are extended by a path that indicates the source of the identifier. In the case of the Delivery_in commitment we have an ID assigned by the Party that receives the Delivery and an ID of the party that sends the Delivery for the same Product. In Delivery_out there is only the ID assigned by the Party that receives the Delivery.

It must be noted that the technique also works if different types would be used instead of parties playing roles. For instance, Party could be subtyped to Sender and Receiver. Then the mappings would contain Sender instead of Party receives Delivery and Receiver instead of Party receives Delivery.

When translating, only the direction 'in to out' can be successful. The out format does not contain enough information because it misses the ID assigned by the Sender.

Example 2

Reality/Message

Another example of structural independence is the distinction between the "real" world and the "messaging" world. Often, a (XML) message contains additional information (such as line numbers, message sequence, . . . ) next to the "real" world information. There is a variety of reasons for this, e.g. security, logging, message ordering or avoiding duplication of messages. Because of the entrenched work practice of also incorporating this information, the "messaging" world mixes with the "real" world and this needs to be incorporated into the pattern and engine.

An example of such an XML is shown in FIG. 11.

The solution is to explicitly incorporate these items into the pattern, as they have become a necessity in the real world as well (e.g., the receiving party notifies the message has been sent twice based on a message containing the same "MessageNo"). This can be incorporated using a "described by/describes" role.

Example 3

"Virtual" Concepts

Take the example where there are no instances of goods available, only a total count of goods of a certain product type and on a certain pallet (e.g., 1200 as the count of goods of Product "Box A" on Pallet "SSCC1"). FIG. 5 illustrates a supplier and consumer delivery XML.

As already described, it is essential for proper real-world semantics to model this real-world concept, even though it is not shown in the XML instances. Also, having the concept in there prepares the pattern for future XML instances that do have goods listed (e.g., because very specific information on each good is also needed such as a serial number).

Referring back to the example where a virtual concept "Good" is incorporated in the semantic pattern, and how it is used in the database, because there is no information on the good in the XML instances, the combination of its typing Product and storing Pallet is used to identify it.

Example 4

Preloading Queries

In one embodiment the present invention provides mappings onto queries instead of ordinary paths.

Messages usually contain some form of derived concepts such as calculations of quantities. Quantity can be a property of any concept and can easily lead to ambiguity and proliferation of concepts. In again the same example XML files, as shown in FIG. 5, one can see that every concept is related with a quantity.

A naive pattern created from these XML files could look like the example presented in FIG. 12. Besides the fact that there is a proliferation of quantity, it is still quite ambiguous as well. Does Quantity of Pallet mean the number of Pallets on the Delivery or the number of Products? And the Quantity of Products, are they the number of types of products, or the instances of products?

To model this right, what is being counted is modelled in the Quantity. In this example it is always Goods that are being counted. A Product indicates the type of Good, but the Good is what is physically on the Pallet and on the Delivery. Thus we add the Good in the way as presented in FIG. 13.

The commitment thus contains mappings onto queries instead of ordinary paths. The reader is referred back to the section on "Structural Independence" to see the mappings onto count( . . . ) and sum( . . . ) queries. The engine preloads this query with the values found in the source message. When performing format translation the engine looks up the values for the mappings on the queries in the source message. If the values are not found, the query is executed and calculated.

For example, when looking for count(Good (of type Product and stored on Pallet and on Delivery)) the engine finds this in both commitments and it can preload the query in both directions of the translation.

When translating from the supplier to the consumer's XML the following query is mapped, but not preloaded: count((Good stored on Pallet) and (Good on Delivery)). This is because it is only mapped in the consumer's commitment and there is no exact value for this quantity in the supplier's XML. Thus the calculation will be performed by the engine as a regular query.

Example 5

Function Overloading

Sometimes complex operations need to be performed on instances that cannot be intuitively handled by a declarative language like Ω-RIDL or XPath. Consider the two XML instances of FIG. 14 where the dates are represented in different granularity. The date in the first message is in the most granular form, the other date is a string that needs to be parsed. The translation should work in both ways.

Figures 14, 15:
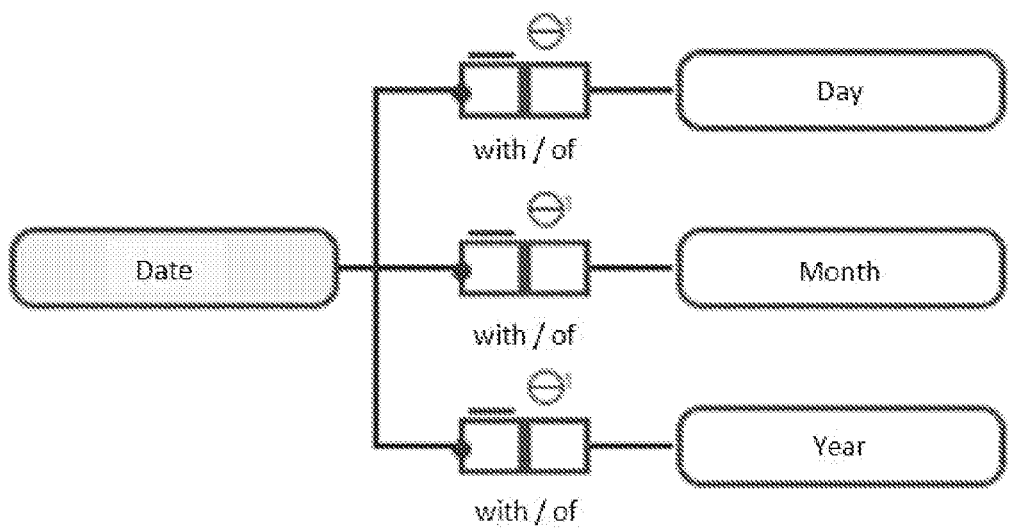
FIG. 14 illustrate two XML instances where the dates are represented in different granularity.
FIG. 15 illustrates a pattern according to the invention in the most granular form comprising a Date concept that consists out of Day, Month and Year.

The method of the present invention provides that the pattern is in the most granular form and thus has a Date concept that consists of Day, Month and Year, as shown in FIG. 15.

The following describes how to augment the Ω-RIDL declarative language with procedural, functional or object oriented scripting. In the samples javascript is used, but this is not al limitation, other languages such as groovy, java or ruby are possible as well.

Input Interception:

When reading the XML file with date as a string the value for Day, Month and Year is intercepted by writing a function with the same name as a concept or path. When giving it the same name as the concept it is called for mappings on any path containing this concept. When giving the same name as the path, only paths or paths containing this path trigger the interception. As programming languages such as javascript do not support spaces in the function names, the spaces are substituted by underscores.

The commitment for the second XML additionally contains function declarations and mappings like the following:

```
function day_of_date(data) {return data.substr(0,4);}
function month_of_date(data) {return data.substr(5,2);}
function year_of_date(data) {return data.substr(8,2);}
```

```
map "/Document/Header/@ActualDespatchDate"
  on Day of Date.
map "/Document/Header/@ActualDespatchDate"
  on Month of Date.
map "/Document/Header/@ActualDespatchDate"
  on Year of Date.
```

The same XML element is mapped three times onto the different parts of the Date. By writing the functions that intercept the mapping, three times a different value is returned. The functions have one or more parameters, which are bound to the values returned by the paths that are given as arguments to the function. The Day returns the first 4 characters of the date string. The Month returns characters 5 to 6, and Year returns 8 to 9. The binding of the method to the path or concept is implicit by using the naming convention. When reading this XML file as input it flawlessly translates to the output XML.

Output Interception:

When writing an XML file to the format of the previous example is still problematic as it isn't specified yet how the more granular parts should be joined to form the string. To do this one needs to write a function that does this and map using this function.

```
function format_date (year, month, day, format) {
    var date = new Date(year, month, day);
    return date.toLocaleFormat(format);
}
map "/Document/Header/@ActualDespatchDate"
  on format_date(Day of Date, Month of Date, Year of Date,
  "%Y-%m-%d").
```

The day, month and year of the date are listed as arguments in the format_date( ) method. For the translation to be successful both ways one still requires the input interception functions as well.

It must be noted that the data structure within the examples is specified in XML, but this may also be a database or any other data format, such as EDI, CSV or an SQL database. The methods of the present invention may be extended to any information system and any data format.

The systems and methods of the present invention may also apply for distributed ontology systems.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application.

The invention claimed is:

1. A computer-implemented method for populating a second data system used in a computer application, said second data system having a structure addressable by at least one second application path, the method comprising the steps of:

a. mapping at least one first application path of a first data system having a structure addressable by said at least one first application path and acting as source data system, to at least one conceptual path of an ontology system using a plurality of semantic patterns structured as a versatile graph, said at least one conceptual path addressing a part of a structure of the ontology system,
b. populating said at least one conceptual path of said ontology system with data values contained in said at least one first application path of said first data system,
c. mapping said at least one second application path of said second data system to the at least one conceptual path of said ontology system using said semantic patterns, and
d. populating said second data system at a location addressed by said at least one second application path with said data values contained in said at least one conceptual path,
wherein said at least one first application path, said at least one conceptual path mapped to said at least one first application path, and said at least one second application path form different structural representations of said data values,
wherein the mappings established in steps a and c by means of said semantic patterns allow populating said first data system with said data values when said second data system acts as source data system.

2. The method as in claim 1, comprising an initial step of generating said second data system, thereby exploiting said structure of said ontology system.

3. The method as in claim 1, wherein said first data system has a structure different from said second data system.

4. The method as in claim 1, wherein said second data system and said first data system are the same.

5. The method as in claim 1, comprising a plurality of first data systems.

6. The method as in claim 1, wherein said at least one conceptual path of said ontology system contains a virtual concept having no corresponding data value in said data system.

7. The method as in claim 1, further comprising:
e. populating said at least one conceptual path of said ontology system with data values contained in said at least one second application path of said second data system; and
f. populating said first data system at a location addressed by said at least one first application path with the data values of said second data system contained in said conceptual path.

8. A non-transitory programmable device containing instructions, which, when executed, perform a method for populating a second data system used in a computer application, said second data system having a structure addressable by at least one second application path, the method comprising:
a. mapping at least one first application path of a first data system having a structure addressable by said at least one one first application path and acting as source data system, to at least one conceptual path of an ontology system using a plurality of semantic patterns structured as a versatile graph, said at least one conceptual path addressing a part of a structure of the ontology system,
b. populating said at least one conceptual path of said ontology system with data values contained in said at least one first application path of said first data system,
c. mapping said at least one second application path of said second data system to the at least one conceptual path of said ontology system using said semantic patterns, and
d. populating said second data system at a location addressed by said at least one second application path with said data values contained in said at least one conceptual path,
wherein said at least one first application path, said at least one conceptual path mapped to said at least one first application path, and said at least one second application path form different structural representations of said data values, and
wherein the mappings established in steps a and c by means of said semantic patterns allow populating said first data system with said data values when said second data system acts as source data system.

9. A device for populating a second data system for use in a computer application, said second data system having a structure addressable by at least one second application path, said device comprising:
means for receiving mapping information for mapping at least one first application path of a first data system having a structure addressable by said at least one first application path and acting as source data system, to at least one conceptual path of an ontology system using a plurality of semantic patterns structured as a versatile graph, said at least one conceptual path addressing a part of the structure of the ontology system and for mapping said at least one second application path of said second data system to at least one conceptual path of said ontology system using said semantic patterns, and
means for populating based on said received mapping information said at least one conceptual path of said ontology system with data values contained in said at least one first application path of said first data system and for populating said second data system based on said received mapping information at a location addressed by said second application path with said data values contained in said conceptual path,
wherein said at least one first application path, said at least one conceptual path, and said at least one second application path form different structural representations of said data values, and
wherein said mapping information also allows populating said first data system with said data values when said second data system acts as source data system.

10. A computer-implemented method comprising:
a. mapping a first application path of a first data system having a structure addressable by the first application path and acting as a source data system, to a conceptual path of an ontology system using a plurality of semantic patterns structured as a versatile graph, the conceptual path addressing a part of a structure of the ontology system;
b. populating the conceptual path of the ontology system with data values contained in the first application path of the first data system;
c. mapping a second application path of a second data system having a structure addressable by the second application path, to the conceptual path of the ontology system using the semantic patterns; and
d. populating the second data system at a location addressed by the second application path with the data values contained in the conceptual path,
wherein the first application path, the conceptual path mapped to the first application path, and the second application path form different structural representations of the data values, wherein the mappings established in steps a and c allow populating said first data system with the data values when the second data system acts as a source data system.

11. The method as in claim 10, further comprising:
e. populating the conceptual path of the ontology system with data values contained in the second application path of the second data system; and
f. populating the first data system at a location addressed by the first application path with the data values of the second data system contained in the conceptual path.

* * * * *